Feb. 25, 1964    H. A. TOULMIN, JR    3,121,925
METHOD AND APPARATUS FOR MAKING HONEYCOMB STRUCTURES
Filed Aug. 16, 1960    2 Sheets-Sheet 1
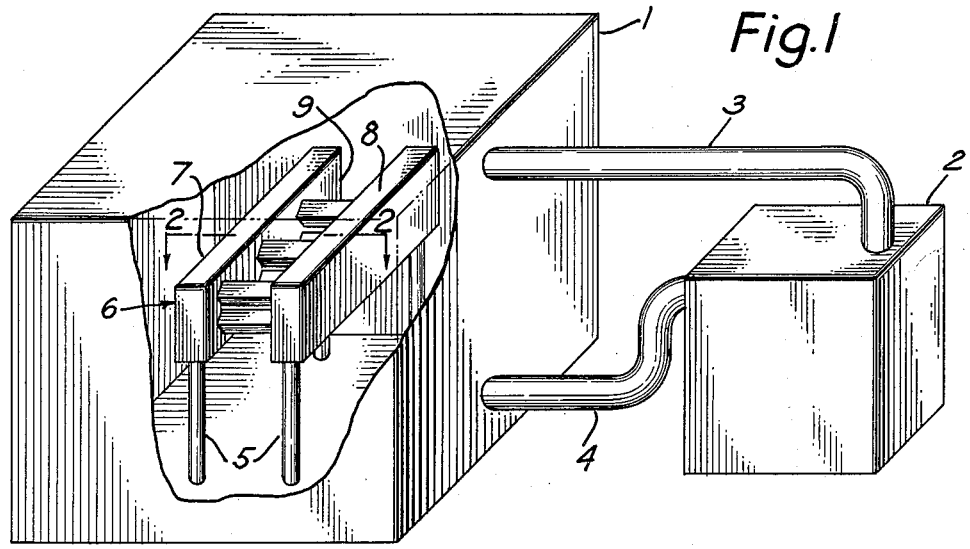
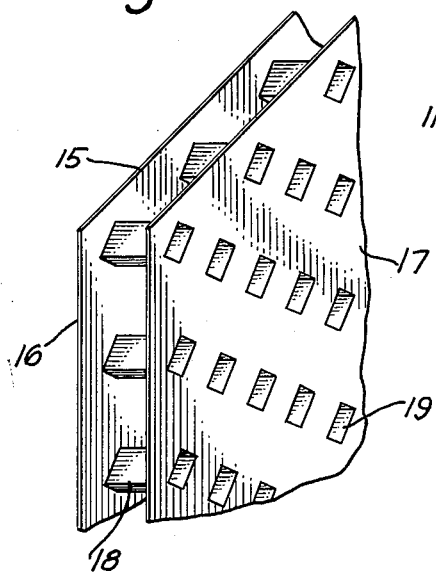
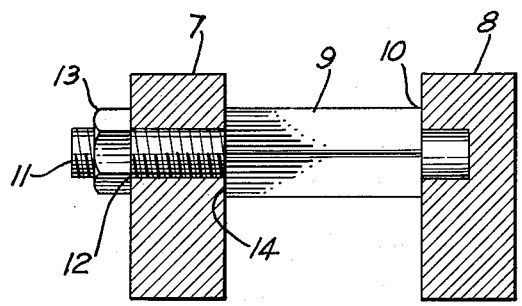
INVENTOR
HARRY A. TOULMIN, JR.
BY Toulmin & Toulmin
ATTORNEYS Feb. 25, 1964   H. A. TOULMIN, JR   3,121,925
METHOD AND APPARATUS FOR MAKING HONEYCOMB STRUCTURES
Filed Aug. 16, 1960   2 Sheets-Sheet 2
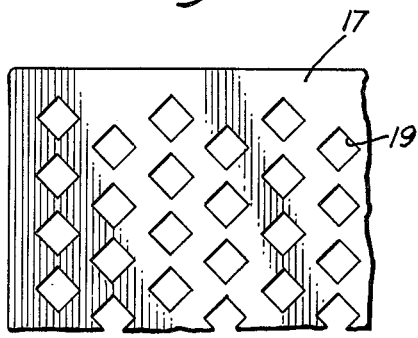
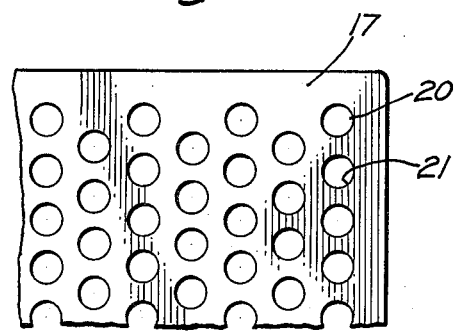
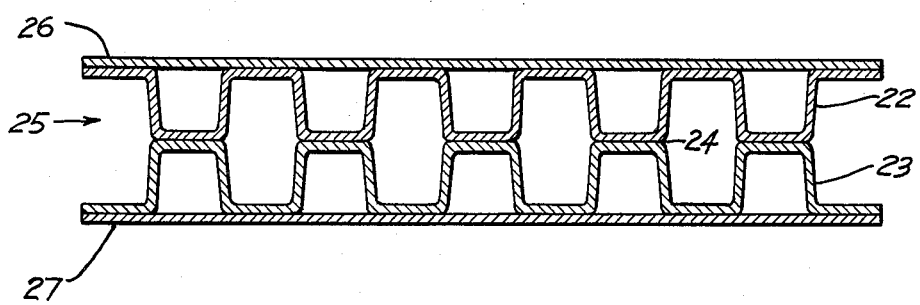
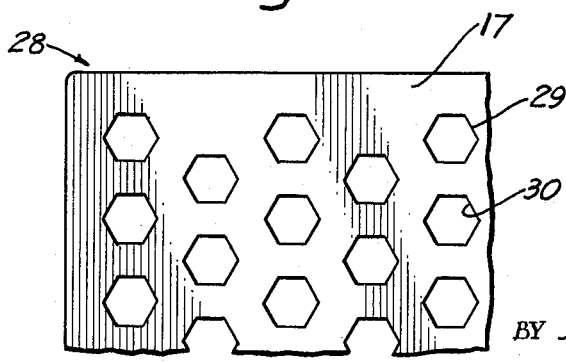
INVENTOR
HARRY A. TOULMIN, JR.
BY Toulmin & Toulmin
ATTORNEYS United States Patent Office 3,121,925
Patented Feb. 25, 1964

3,121,925
METHOD AND APPARATUS FOR MAKING HONEYCOMB STRUCTURES
Harry A. Toulmin, Jr., 308 W. 1st St., Dayton, Ohio
Filed Aug. 16, 1960, Ser. No. 49,974
7 Claims. (Cl. 22—57)

The present invention relates to the fabrication of honeycomb structures, more particularly, to apparatus and method for forming metallic honeycomb structures by a gas plating process.

The honeycomb structural element comprises a pair of spaced parallel flat members commonly designated as skins which are interconnected by a core structure. The core structure comprises a plurality of spaced parallel tubular members and when assembled with the skins the entire formation closely resembles a natural honeycomb. The outstanding strength-to-weight ratios inherent in such honeycomb structures, when the structures are fabricated from light-weight metal, have resulted in directing considerable attention to the use of honeycomb structures. Honeycomb structures have been used as structural supports in high-speed aircraft, rockets and other forms of missiles and in numerous other military and civilian constructions.

A typical honeycomb structure similar to that as described above might be formed from stainless steel and comprises a core with openings that may vary from one-sixteenth of an inch to one inch and higher. Stainless steel strip which has been vented by a punching operation to allow the escape of brazing gases is then used for attaching the skins to the ends of the core. The skin may then be crimped to the honeycomb structure. Subsequently formed stainless steel strips can then be resistance-welded along a plurality of joints to complete the structure.

In general, most all of the material used in the construction of honeycomb structures has been fabricated by various techniques all of which utilize a venting, crimping and complex positioning and indexing operation for proper welding of the nodes.

The present invention discloses an improved apparatus and method for making honeycomb structures which also eliminates the disadvantages previously associated with the manufacture of honeycomb structures. In the present invention two platens are connected at an appropriate distance by a plurality of pegs having a square cross-section. These pegs are spaced from each other so as to form a regular pattern. The opposing faces of the platens and the surfaces of the pegs are then heated to a temperature which is above the temperature of decomposition of a heat decomposable gaseous metal bearing compound. This gaseous compound is then introduced into a closed atmosphere which also contains the platen and peg assembly and the metal is deposited from the gaseous compound on the heated surfaces.

This metal deposition process, called gas plating, is continued until the desired depth of deposit metal is obtained. The platens and pegs are then separated and removed from the metallic deposit. The resulting metallic structure is a unitary honeycomb structure wherein the core comprises a plurality of square tubes spaced from each other and interconnecting two parallel flat surfaces known as the skins.

While this structure is somewhat different than the so-called "conventional honeycomb structure," nevertheless, the present honeycomb structure has all of the advantages of the so-called "conventional honeycomb structures."

The invention disclosed herein has a number of outstanding advantages. The use of the gas plating process eliminates complex mechanical and hydraulic positioning steps and also the previously complicated welding procedures which were used.

Additional advantages of the present invention can be summarized as follows:

(1) Elimination of difficulties in attaching the core to the skins, which difficulties arose because of metal growths, carbon blocks, descaling and voids. These aforementioned difficulties are not encountered in the present invention because of the absence of brazing and heat treating of the honeycomb structures.

(2) The elimination of numerous difficulties involved in processes with respect to the brazing of honeycomb skins.

(3) The elimination of adhesive bonding such as commonly used in light-weight honeycombs formed of aluminum, paper or plastic resin impregnated paper materials.

(4) The elimination of punched vents at spaced intervals in the metallic strips to permit the escape of brazing gases. The presence of these vents materially contributed to reducing the strength-to-weight ratios of previous metallic honeycomb structures.

(5) The elimination of brazing operations in general for attaching the skins to the honeycomb core.

It is therefore the principal object of this invention to provide a novel and improved apparatus and method of making honeycomb structures.

It is another object of this invention to provide an apparatus and method for forming honeycomb structures by a gas plating process.

It is another object of this invention to provide an apparatus and method for forming honeycomb structures by the carefully regulated deposition of metal on surfaces so as to form a unitary honeycomb structure.

Other objects and advantages of this invention will become apparent upon reference to the accompanying description when taken into conjunction with the following drawings wherein:

FIG. 1 is an over-all perspective view of the apparatus employed for constructing the honeycomb structure with portions of the wall of the chamber being removed to show the arrangement of the components within the container;

FIG. 2 is a sectional view taken along the line 2—2 of FIG. 1 to show the assembly of the platens and the pegs;

FIG. 3 is an over-all perspective view of the honeycomb structure formed by the apparatus illustrated in FIG. 1;

FIG. 4 is a plan view of the honeycomb structure illustrated in FIG. 3;

FIG. 5 is a plan view similar to that of FIG. 4 but showing a modified form of the honeycomb structure wherein the core has a somewhat different shape;

FIG. 6 is a sectional view through a second modified form of a honeycomb structure; and FIG. 7 is a plan view similar to that of FIGS. 4 and 5 but of another modified form of the honeycomb structure wherein the core again has a different shape.

Returning now to the drawings wherein like reference symbols indicate the same parts throughout the various views, a description will be given of a specific embodiment of the present invention. With particular reference to FIG. 1 the apparatus pictured therein comprises a closed chamber 1 which may be constructed of stainless steel, a hard glass or any other suitable material.

Spaced from the chamber 1 is a gaseous metal carbonyl generator 2 which is connected to the chamber 1 by a discharge conduit 3 through which the gas is introduced into the chamber and a return conduit 4 through which the carbon monoxide gases are withdrawn from the chamber. This generator may be of the type disclosed in United States Patent 2,332,309.

Mounted within the chamber 1 is a supporting structure 5 upon which is assembled a substrate structure or honeycomb pattern 6. The honeycomb pattern comprises a pair of platen members 7 and 8 which are formed of a suitable metal and are positioned so that the opposed faces thereof are parallel to and spaced from each other. The platen members 7 and 8 may also be made of a plastic material since the gas plating process utilized herein will also deposit metal upon nonmetallic surfaces.

A plurality of square pegs 9 interconnect the opposed faces of the platen members 7 and 8. These pegs are all similarly fastened and the structure of the fastening is illustrated in greater detail in FIG. 2. In FIG. 2 it can be seen that one end 10 of the peg 9 is permanently secured to the platen member 8 and the other end 11 passes through an opening 12 in the platen member 7. The end 11 is threaded and receives a nut 13 which nut when tightened will force the platen member 7 against a shoulder 14 on the peg 9 which divides the threaded portion of the peg from the remainder thereof. The pegs 9 are all spaced from each other so that none of the pegs are in contact and thus no closed chambers are formed by the pegs between the platens.

While the pegs 9 have been illustrated as being square in cross-section, any other desired cross-section may be imparted to these pegs. Examples of other cross-sections which may be employed are circular, elliptical or hexagonal which is a shape commonly used in conventional honeycomb structures because of its structural properties.

With the above described structure in mind the operation of the apparatus and the process by which the honeycomb structure is formed will next be described. The process of forming the honeycomb structure essentially comprises bringing about the separation of metal from a volatile compound by its decomposition in the presence of the pattern which is to be coated. The surfaces of the pattern which are to be coated comprise the opposed faces of the platen members 7 and 8 and the exposed surfaces of the peg 9 between the platen members. Accordingly, heating elements may be imbedded in these surfaces so as to heat these surfaces above the decomposition temperature of the volatile compound. Other means of heating these surfaces may be employed, such as constructing these surfaces of particular materials and then heating the entire chamber 1 to a degree that the surfaces of the pattern which are to be coated attain a temperature above the decomposition temperature. As as alternative all exposed parts of the pattern which are not to be coated may be covered with a heat insulating coating or fabrication so as to resist the deposition of the metal thereon. Glass, ceramic or synthetic resin products may be used for this purpose.

When the surfaces of the pattern have been brought to the desired temperature a flow of gas is introduced into the chamber 1 from the generator 2. For example, if it is desired to form a honeycomb structure from nickel, the generator will produce a nickel carbonyl compound. This volatile metallic compound is then circulated through the passage 3 into the chamber 1 and then back to the return line 4 to the generator. Fans may be provided to assist in the circulation process.

By controlling the temperature on particular surfaces of the honeycomb pattern there will occur a decomposition of the metal carbonyl and the carbon monoxide, which is freed during the process, will be returned to the generator to be used again to generate more of the metal carbonyl compound.

This process is continued until a desired depth of deposited metal is obtained. The generator is then stopped and the chamber 1 evacuated from poisonous gas fumes. The platens are then separated and the coated metal which is now removed will form a honeycomb structure as indicated at 15 in FIG. 3 of the drawings. This honeycomb structure comprises skins 16 and 17 which are interconnected by a plurality of square tubes 18 which correspond in shape to the pegs 9. The ends of the tubes 18 are open as shown at 19.

In order to facilitate the removal of the completed honeycomb from the honeycomb pattern, the opposed surfaces of the platens and the exposed surface of the pegs are provided with a smooth prepared surface to which the deposited metal has little adherence. Conditioning of these surfaces against adherence of deposited metal may be accomplished by blowing powdered graphite onto the surfaces or by continuously sizing the roll with a wax or resin which does not soften appreciably at the temperaure of the decomposition of the metals from the volatile compounds.

As an alternative, a thin plating or coating of material which prevents the deposited metals from adhering tightly to the surfaces is applied to the surfaces. Metals which can be deposited as thin film comprise, for example, nickel, chromium, copper, tungsten, tin, zinc, lead and the like. The readily decomposable gaseous compounds may comprise gaseous metal carbonyls, also nitroxyl compounds, nitrosyl carbonyls, metal hydrides, metal alkyls, metal halides, and the like.

Another gas plating process which may be employed is disclosed in U.S. Patent 2,685,121.

In FIG. 5 there is showed a plan view of a modified honeycomb structure wherein the skins 16 and 17 are interconnected by tubular structures having a circular cross-section as indicated at 20. The tubes are also open on the surfaces of both of the skins indicated at 21.

A further modification of this invention is illustrated in FIG. 6. The metal is deposited by the gas plating process upon molds which are similar in shape to a waffle iron. The two halves of the structures thus formed, 22 and 23, are then bonded together at 24 and the result is honeycomb structure 25 having a configuration similar to that of the conventional waffle. Skin surfaces 26 and 27 are then secured on both sides of the resulting honeycomb structure and the result will be the cross-section as illustrated in FIG. 6.

In FIG. 7 there is shown a plan view of still another modified honeycomb structure illustrated indicated generally at 28 wherein the skins 16 and 17 are interconnected by tubes having a hexagonal cross-section shown in 29. These tubes are also open on the surfaces of both the skins as indicated at 30.

Thus it can be seen that the present invention discloses a simplified and economical apparatus and process for the fabrication of honeycomb structures and other architectural elements. The resulting honeycomb structure has considerably more favorable qualities than the honeycomb structure fabricated by the assembly of the core and skin components. The honeycomb structure resulting from this invention is a unitary and integral unit and does not rely in any way on its strength on the bond between the core and skin structures of the honeycomb. Further, the deposition of the metal through the glass plating process results in a close control over the thickness of the metal surfaces and a considerably faster process.

It will be understood that this invention is susceptible to modification in order to adapt it to different usages and conditions, and, accordingly, it is desired to comprehend such modifications within this invention as may fall within the scope of the appended claims.

I claim:

1. In a method of making metallic honeycomb structures, the steps comprising forming a pattern of a honeycomb structure, subjecting the honeycomb structure to an atmosphere of a heat decomposable gaseous metal compound, heating the surfaces of the honeycomb structure pattern to a temperature above the temperature of thermal decomposition of said gaseous metal compound whereby the metal deposited from the compound will form a single honeycomb structure, and disassembling the honeycomb structure pattern and removing the same from the deposited metal so that the deposited metal remaining is in the form of a honeycomb structure.

2. In a method of making metallic honeycomb structures, the steps comprising positioning a pair of platen members with opposed faces in spaced relationship to each other, assembling a plurality of spaced pegs therebetween to interconnect the opposed faces of the platen members, depositing a metallic coating on the opposed faces of the platen members and the surfaces of the pegs by contacting the same while heated with a heat decomposable gaseous metal compound, and removing the platen members and pegs after the deposited metal has reached a predetermined thickness of metal and the deposited metal forms an integral honeycomb structure.

3. In a method of making metallic honeycomb structures, the steps comprising positioning a pair of platen members with the opposed faces thereof in spaced relationship to each other, assembling a plurality of pegs therebetween to interconnect the opposed faces of the platen members, and depositing a metallic coating on the opposed faces of the platen members and the opposed faces of the pegs by contacting the same while heated with a thermal heat decomposable gaseous metal compound.

4. In a method of making metallic honeycomb structures, the steps comprising forming a pattern for a honeycomb structure, subjecting the honeycomb structure to an atmosphere of a heat decomposable gaseous metallic compound, heating the surfaces of the honeycomb structure pattern to a temperature above the temperature of thermal decomposition of the gaseous metallic compound whereby the metal deposited upon decomposition the compound forms a single honeycomb structure, and disassembling the honeycomb structure pattern and removing the same from the deposited metal so that the said deposited metal remaining is in the form of a honeycomb structure, and treating the surfaces of the honeycomb structure to prevent the adherence of metal deposited thereon.

5. In a method of making metallic honeycomb structures, the steps comprising positioning a pair of platen members with the opposed faces thereof in spaced relationship to each other, assembling a plurality of pegs therebetween to interconnect the opposed faces of the platen members, said pegs each having a square cross-section and being spaced from each other and arranged in a regular pattern, depositing a metal coating on the opposed faces of the platen members and the exposed surfaces of the pegs by the thermal decomposition of a gaseous metal compound, and removing the platen members and pegs from the deposited metal after a predetermined thickness of metal has been attained whereby the deposited metal comprises a single honeycomb structure.

6. In an apparatus for making honeycomb structures, a pair of platen members arranged with opposing faces being spaced from each other, a plurality of pegs disposed therebetween and interconnecting the opposed faces of said platen members, and means comprising a gas plating chamber for depositing a metal coating on the opposed faces of said platen members and the exposed faces of said pegs by the thermal decomposition of a gaseous metallic compound so as to form a honeycomb structure.

7. An apparatus for making honeycomb structures, a closed chamber, a pair of platen members in said closed chamber and arranged with the opposed faces thereof being spaced from each other, a plurality of pegs therebetween and interconnecting the opposed faces of said platen members, means for heating the opposed surfaces of said platen members and the exposed surfaces of said pegs, a source of a heat decomposable gaseous metal compound connected to said chamber for introducing said gaseous metal compound therein whereby said compound is decomposed upon contact with said heated surfaces to form a metallic coating thereon.

References Cited in the file of this patent

UNITED STATES PATENTS

| | | |
|---|---|---|
| 2,499,977 | Scott | Mar. 7, 1950 |
| 2,619,433 | Davis et al. | Nov. 25, 1952 |
| 2,834,690 | Marvin | May 13, 1958 |

FOREIGN PATENTS

| | | |
|---|---|---|
| 792,589 | Great Britain | Apr. 2, 1958 |